Patented Aug. 9, 1949

2,478,645

UNITED STATES PATENT OFFICE 2,478,645

PORCELAIN GLAZE COMPOSITIONS

Ludwig E. Thiess, Schenectady, N. Y., assignor to General Electric Company, a corporation of New York No Drawing. Application September 30, 1947, Serial No. 777,128

4 Claims. (Cl. 106—48)

This invention relates to glaze compositions for porcelains of electrical insulating bushings, and more particularly to glazes having improved resistance to the deposition of carbon particles on the porcelains.

In oil-filled electrical apparatus and particularly apparatus in which bushing porcelains are immersed in oil such as, for example, in oil-filled circuit breakers, difficulty is frequently experienced with the deposition of fine carbon particles on the surfaces of the bushing porcelains. For example, in oil-filled circuit breakers, when the contacts open and an arc is formed, the heat of the arc decomposes the oil, forming gases which bubble to the surface of the oil and also colloidal particles of carbon having a diameter of about 0.1 micron which remain suspended in the oil. Because of the higher temperature of the oil surrounding the carbon particles, the carbon particles move toward the surface of the oil, and during this migration pass sufficiently close to the bushings to fall into the influence of the electric field at the surfaces of the bushing porcelains. The carbon particles are attracted to the surface of the porcelains at points of maximum flux density, thus forming an undesirable conducting film of carbon on the surface of the bushing. The resulting carbon deposits cause poor performance of the equipment and necessitate frequent shutdowns to permit cleaning of the bushing porcelains.

It has been found that, even though the bushing is properly designed to avoid areas of high flux density to as great an extent as possible, difficulties may still be experienced with the deposition of carbon attributable to the nature of the glaze employed on the surfaces of the bushing porcelains. By microscopic examination of such glazes it has been determined that non-homogeneous glazes containing gas bubbles or appreciable amounts of undissolved grains, crystalline material, or certain refractory oxides, such as, for example, chromic oxide, which may be present either as impurities or as a result of additions for coloring purposes, are particularly poor from the standpoint of being resistant to the deposition of carbon. Carbon particles moving close to a non-homogeneous glaze containing gas bubbles and inclusions of solid materials are attracted to the glaze at the areas of electrical stress concentrations adjacent such bubbles or inclusions.

Employing the compositions of my invention, I have been able to produce consistently homogeneous porcelain glazes which have a high surface gloss and smoothness and which are substantially free of gas bubbles and undissolved grains or crystals. I have discovered that when these glaze compositions are properly applied and fired on bushing porcelains, the resulting surface shows a greatly improved resistance to the deposition of carbon. Circuit breakers having bushing porcelains coated with these glaze compositions may be operated for long periods of time without the necessity for cleaning the surfaces of the porcelains.

An essential ingredient of the glazes of my invention is a frit which is prepared by intimately mixing and firing at about 1300° C. the following ingredients in the proportions given:

| | Per cent by weight |
|---|---|
| Silica ($SiO_2$) | 70.0 to 84.0 |
| Manganese carbonate | 6.5 to 14.5 |
| Ferric oxide ($Fe_2O_3$) | 6.0 to 12.0 |
| Boric acid ($B_2O_3.3H_2O$) | 2.0 to 7.0 |

In place of the manganese carbonate indicated above as a component of the frit, it is to be understood that I may employ manganese oxide in chemically equivalent amounts.

The following is an example of one mixture of ingredients which, when mixed and fired as described above, provides a frit for use in the glazes of the invention:

| | Per cent by weight |
|---|---|
| Flint (silica) | 71.0 |
| Manganese carbonate | 12.5 |
| Iron oxide ($Fe_2O_3$) | 10.5 |
| Boric acid ($B_2O_3.3H_2O$) | 6.0 |

The above-described frits are mixed by wet grinding, or by other means well known in the ceramic art, with glaze-forming materials including whiting ($CaCO_3$), ball clay $$(Al_2O_3.2SiO_2.2H_2O)$$

and potash feldspar ($K_2O.Al_2O_3.6SiO_2$) or nepheline syenite ($K_2O.3Na_2O.4Al_2O.9SiO_2$). Part or all of the potash feldspar may be replaced by nepheline syenite ($K_2O.3Na_2O.4Al_2O.9SiO_2$). I have found that in order to obtain glazes of the desired improved properties set forth above, the ingredients are preferably employed in the following range of proportions:

| | Per cent by weight |
|---|---|
| Potash feldspar | 17.0 to 21.0 |
| Whiting | 15.5 to 16.5 |
| Ball clay | 19.0 to 23.0 |
| Frit (above formula) | 30.0 to 45.0 |

The following glaze composition has been found to afford particularly good results from the standpoint of resisting the deposition of carbon when applied as a glaze to bushing porcelains:

| | Per cent by weight |
|---|---|
| Potash feldspar | 18.6 |
| Whiting | 16.3 |
| Ball clay | 23.0 |
| Frit (above formula) | 42.1 |

I have further discovered that the addition of a small amount of a lead-borosilicate glass of the composition set forth below to glaze compositions of my invention produces glaze compositions of relatively low viscosity that are completely free of gas bubbles and, as far as can be determined, are free from inclusions such as insoluble crystalline material, for example, free or partially dissolved quartz. The composition of the lead-borosilicate glass which I add for this purpose is as follows:

| | Per cent by weight |
|---|---|
| Lead oxide (PbO) | 30 |
| Boric oxide ($B_2O_3$) | 27 |
| Silica ($SiO_2$) | 34 |
| Alumina ($Al_2O_3$) | 7 |
| Sodium oxide ($Na_2O$) | 2 |

The compositions of glazes containing the above lead-borosilicate glass are practically the same as the glazes mentioned above except for the addition of a small amount of the above glass. The following is glaze composition embodying this modification of my invention:

| | Per cent by weight |
|---|---|
| Potash feldspar | 10 |
| Nepheline syenite | 10 |
| Whiting | 16 |
| Ball clay | 19 |
| Frit (above formula) | 41 |
| Lead-borosilicate glass | 4 |

In applying the above described glaze compositions to the surfaces of the bushing porcelains, any of the methods well known in the art may be employed. For example, a slip containing glazes may be prepared, which in turn is applied to the unfired bushing porcelains by dipping, brushing, or spraying techniques followed by firing in pottery kilns of the conventional type at a temperature approximately equivalent to pyrometric cone 11 (1350° C.).

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A porcelain glaze for application to unfired porcelain insulating bushings consisting of, by weight, 17 to 21 per cent potash feldspar, 15.5 to 16.5 per cent whiting, 19 to 23 per cent ball clay, and 30 to 45 per cent of a fired mix consisting of, by weight, about 71 per cent silica, 12.5 per cent manganese carbonate, 10.5 per cent iron oxide, and 6 per cent boric acid.

2. A porcelain glaze consisting of, by weight, about 18.6 per cent feldspar, 16.3 per cent whiting, 23 per cent ball clay, and 42.1 per cent of a fired mix consisting of, by weight, about 71 per cent silica, 12.5 per cent manganese carbonate, 10.5 per cent iron oxide, and 6 per cent boric acid.

3. A porcelain glaze for application to unfired porcelain insulating bushings consisting of, by weight, about 10 per cent feldspar, 10 per cent nepheline syenite, 16 per cent whiting, 19 per cent ball clay, 4 per cent of a lead-borosilicate glass, consisting of, by weight, about 30 per cent lead oxide, 27 per cent boric acid, 34 per cent silica, 7 per cent alumina, and 2 per cent sodium oxide, and 41 per cent of a fired mix consisting of, by weight, about 71 per cent silica, 12.5 per cent manganese carbonate, 10.5 per cent iron oxide, and 6 per cent boric acid.

4. A porcelain glaze comprising a mixture of glaze forming materials including, by weight, 15.5 to 16.5 per cent whiting, 19 to 23 per cent ball clay, 17 to 21 per cent potash feldspar and 30 to 45 per cent of a fired mix consisting of, by weight of about 70 to 84 per cent silica, 6.5 to 14.5 per cent manganese carbonate, 6 to 12 per cent ferric oxide and 2 to 7 per cent boric acid.

LUDWIG E. THIESS.

REFERENCES CITED

The following references are of record in the file of this patent:

UNITED STATES PATENTS

| Number | Name | Date |
|---|---|---|
| 250,465 | Volbrath | Dec. 6, 1881 |